(12) United States Patent
Noguchi et al.

(10) Patent No.: US 7,324,486 B2
(45) Date of Patent: Jan. 29, 2008

(54) WIRELESS COMMUNICATION SYSTEM

(75) Inventors: Shigetaka Noguchi, Ibaraki (JP);
Minoru Kosaka, Chiba (JP);
Katsuyuki Machino, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 590 days.

(21) Appl. No.: 10/486,556

(22) PCT Filed: Nov. 25, 2002

(86) PCT No.: PCT/JP02/12269

§ 371 (c)(1),
(2), (4) Date: Feb. 10, 2004

(87) PCT Pub. No.: WO03/047174

PCT Pub. Date: Jun. 5, 2003

(65) Prior Publication Data

US 2004/0208140 A1 Oct. 21, 2004

(30) Foreign Application Priority Data

Nov. 27, 2001 (JP) ............................ 2001-361212

(51) Int. Cl.
*H04J 3/00* (2006.01)
(52) U.S. Cl. .................. 370/336; 370/338; 370/447
(58) Field of Classification Search ................ 370/336, 370/338, 347, 445, 447, 450–462; 455/451–455
See application file for complete search history.

(56) References Cited

U.S. PATENT DOCUMENTS

| 5,732,076 A | 3/1998 | Ketseoglou et al. |
| 6,754,176 B1* | 6/2004 | Gubbi et al. ................ 370/230 |
| 2002/0105970 A1* | 8/2002 | Shvodian .................... 370/468 |

FOREIGN PATENT DOCUMENTS

| EP | 0830045 A | 3/1998 |
| JP | 11/225145 A | 8/1999 |
| JP | 2000-316183 A | 11/2000 |
| JP | 2001-045027 A | 2/2001 |
| WO | 00/02353 A1 | 1/2000 |
| WO | 00/49828 A1 | 8/2000 |
| WO | WO-01/71946 A1 | 9/2001 |

* cited by examiner

*Primary Examiner*—Lee Nguyen
(74) *Attorney, Agent, or Firm*—Birch, Stewart, Kolasch & Birch, LLP

(57) ABSTRACT

A second wireless communication system comprises reception means for receiving a control signal transmitted by a first wireless system which defines its own communication-enabled period based on the control signal, and communication control means for determining, based on the control signal, a vacant time region in the communication-enabled period that is not utilized by the first wireless communication system, and allocating the vacant time region as its own communication time region.

19 Claims, 14 Drawing Sheets

WIRELESS COMMUNICATION SYSTEM

This Non-provisional application claims priority under 35 U.S.C. 119(a) on Patent Application No(s). 2001-361212 filed in Japan on Nov. 27, 2001, the entire contents of which are hereby incorporated by reference.

TECHNICAL FIELD

The present invention relates to a wireless communication system and in particular to a system for enabling a plurality of wireless communication systems to coexist.

BACKGROUND ART

In recent years, a plurality of TDMA (Time Division Multiple Access) wireless LAN systems have been proposed and standardized in the 2.4 GHz or 5 GHz ISM (Industrial, Science, and Medical) bands. In the TDMA scheme, communication is carried out by allocating different time regions for individual mobile stations in the same frequency band. In the TDMA wireless LAN systems, there are a centralized control scheme and a distributed control scheme.

FIG. 12 shows the configuration of a wireless LAN system of the centralized control scheme. As shown in FIG. 12, a wireless LAN system 101 of the centralized control scheme comprises a base station 103 for allocating communication time bands (time regions for carrying out communications) to mobile stations, and a plurality of mobile stations, for example a first, a second and a third mobile station 105, 107 and 111, whose timings of communication are controlled by the base station 103.

The base station 103 has a central control device 115, for example, either built inside or connected thereto. It may also be connected to a wide area network (WAN) 117. The base station 103 and the first to third mobile stations 105, 107 and 111 can communicate with one anotherviasignals 118-1 to 118-3.

FIG. 13 shows an example of the configuration of a second wireless communication system 102 of the distributed control scheme. As shown in FIG. 13, the second wireless LAN system 102 comprises a first to a fourth mobile station 121, 123, 125 and 127. The first to fourth mobile stations 121, 123, 125 and 127 can communicate with one another via signals 131-1 to 131-4. The mobile stations issue communication requests to one another and adjust the timing of communication between them individually.

Representative of the wireless communication system of the centralized control scheme are ARIB (Association of Radio Industries and Businesses) STD-T70 (HiSWANa), ETSI (European Telecommunications Standards Institute) HiperLAN/2, and Bluetooth developed by an industry association, for example.

Representative of the distributed control scheme are IEEE802 committee 802.11a, IEEE 802 committee 802.11b, and ARIB RCR STD-T33, for example.

When communications are performed using wireless communication devices according to the aforementioned standards, or using notebook PCs (personal computers), PDAs (personal digital assistants) or the like equipped with such devices, it is necessary to avoid mutual interference that occurs when communication areas overlap upon one another.

In the aforementioned 802.11b or Bluetooth, for example, a frequency hopping scheme is defined (whereby the transmission channel is changed at certain time intervals to limit the time of occupation of the transmission channel and thereby reduce the influence of mutual interference.).

Further, various communication control methods have been proposed or standardized, including the CSMA/CA scheme such as 802.11a, 802.11b or STD-T71 (in which some collision preventing function is provided to prevent the collision (interference) of signal radio waves, in addition to carrier sensing, such that if the channel is in use for example, carrier sensing is continued until the channel is available).

However, in reality, the above-mentioned interference avoiding methods only help to reduce interference.

JP Patent Publication (Kokai) No. 2001-45027 discloses a technique relating to the avoidance or reduction of interference between different systems. The publication discloses the base station of a first wireless communication system transmits a transmission permission signal to the base station of a second wireless communication system by polling. In response to the transmission permission signal, the base station of the second wireless communication system transmits transmission permission signal delay information to the base station of the first wireless communication system. The base station of the first wireless communication system then decodes the transmission permission signal delay information and delays transmission permission to the mobile station included in the first wireless communication system. The base station of the first wireless communication system and that of the second wireless communication system communicate to one another, so that a band can be ensured for use by the second wireless communication system, which, using the band, can carry out wireless communications.

By using this technique, the second wireless communication system signal can be transmitted by polling by which communication is permitted by designating a communication time in the occupied frequency band of the first wireless communication system, so that the same frequency band can be shared between different systems.

However, the technique described in the above publication is difficult to be applied to the case where at least one of the wireless communication systems to be made to coexist is of the centralized control scheme in which there is a periodic frame configuration and the operation is based on a control signal transmitted by a base station.

The present invention provides a technique for preventing interference among a plurality of wireless communication systems including one of the centralized control scheme so that bands can be efficiently managed.

BRIEF SUMMARY OF THE INVENTION

In one aspect, the invention provides a second wireless communication system comprising reception means for receiving a control signal transmitted by a first wireless communication system which defines its own communication-enabled period based on said control signal, and communication control means for determining, based on said control signal received by said reception means, a vacant time region in said communication-enabled period which is not utilized by said first wireless communication system, and allocating that vacant time region as its own communication time region.

In accordance with this second wireless communication system, a vacant time region in the first wireless communication system can be allocated as its own communication time region, so that the time region can be effectively utilized.

In another aspect, the invention provides a first wireless communication system which defines its own communication-enabled period based on a control signal, said first wireless communication system comprising time region readjusting means for receiving a communication time region request signal requesting for the utilization by a second wireless communication system and readjusting, based on said communication time region request signal, the time allocations for a first time region utilized by said first wireless communication system and for a second time region utilized by said second wireless communication system.

In accordance with this wireless communication system, allocations for a communication requested time region for the second wireless communication system and a time region necessary for communication by the first wireless communication system are readjusted, so that the time region can be more effectively utilized.

BEST MODE OF CARRYING OUT THE INVENTION

The term "base station" herein refers to a station in a wireless communication system by which the system is controlled. The base station is also referred to as an access point, a polling master, a hub station, or a control station, for example. The individual mobile devices that carries out communications are referred to as mobile stations, which may also be referred to as terminals or stations. A first wireless communication system comprises a base station and is a wireless communication system of the centralized control scheme that is operated based on a control signal transmitted by the base station. A second wireless communication system on the other hand includes at least a mobile station and may also include a base station.

The invention is based on the inventors' realization that by having the base station or a mobile station of the second wireless communication system decode control information transmitted by the base station of the first wireless communication system of the centralized control scheme to determine a time region not used by the first wireless communication system, and carrying out data communication for the second wireless communication system in that time region, interference between the systems can be reduced and thus the frequency utilization efficiency can be increased without carrying out communication between the first and second wireless communication systems for adjustment.

Based on that concept, a wireless communication system according to a first embodiment of the invention will be described by referring to FIGS. 1 to 7.

Figure 1:
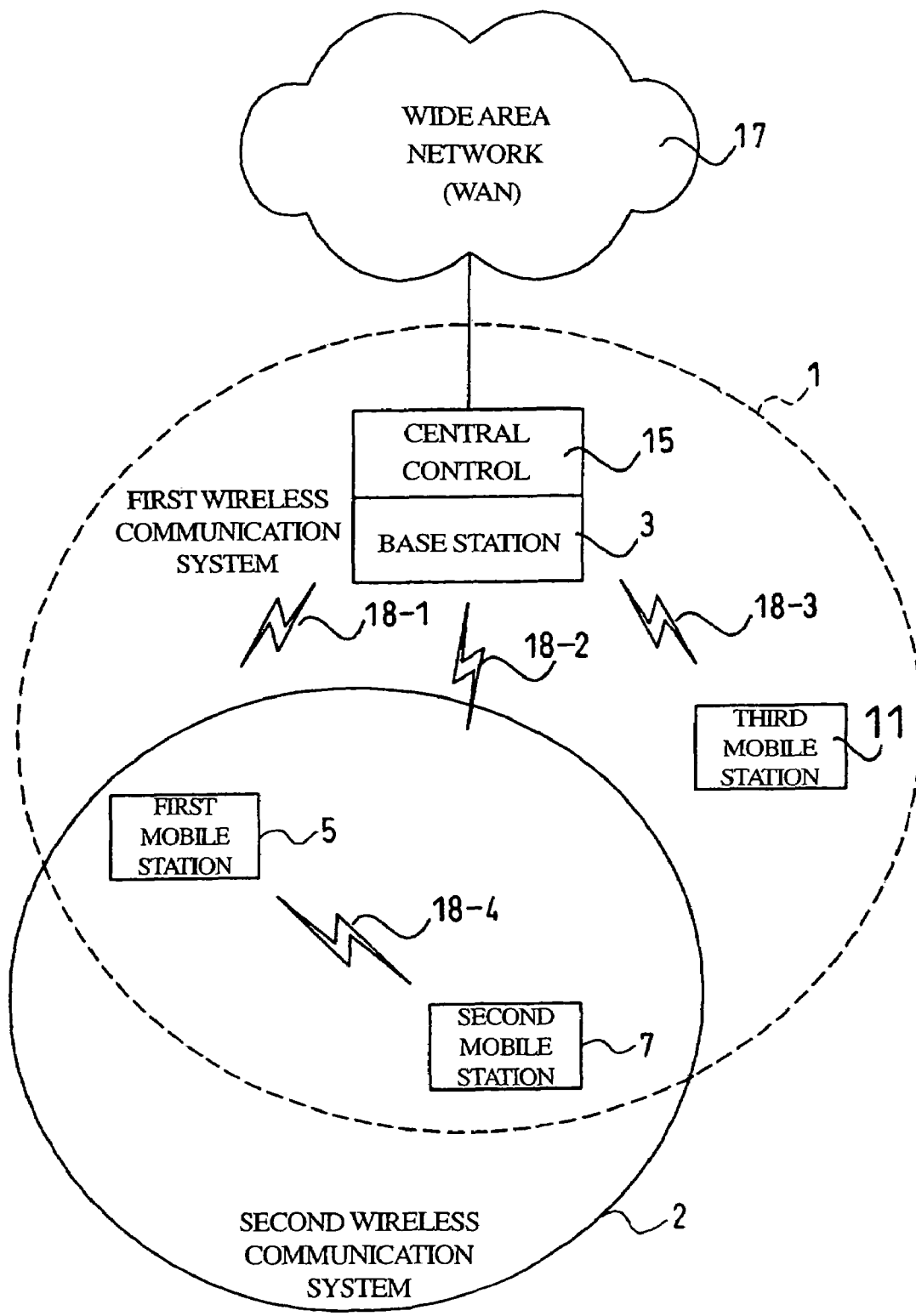
FIG. 1 shows the configuration of a wireless communication system according to a first embodiment of the invention.

FIG. 1 shows the configuration of the wireless communication system of the first embodiment. As shown in FIG. 1, the wireless communication system of the first embodiment comprises a first wireless communication system 1 and a second wireless communication system 2. The first wireless communication system 1 includes a base station 3 and a third mobile station 11, for example, and may further include many other mobile stations. The base station 3 includes a central control device 15. The base station 3 controls the first wireless communication system 1 by transmitting a control signal to the mobile station. A wide area network (WAN) 17 may be related to the base station 3.

The second wireless communication system 2 comprises a first mobile station 5 and a second mobile station 7, for example, and may further include many other mobile stations. This is a wireless communication system of the distributed control scheme that has no base station for transmitting a control signal.

It is now assumed that the radio wave transmitted by the base station 3 has a transmission level that is detectable by at least one of the first and second mobile stations 5 and 7 included in the second wireless communication system 2 that is towards the transmitting side. Thus, FIG. 1 shows a state where the first and second wireless communication systems 1 and 2 are close to each other and where there is the possibility of radio wave interferences. It is also supposed that the first and second wireless communication systems 1 and 2 share the same frequency band (channel).

When the second wireless communication system 2 begins to communicate, either the first mobile station 5 or the second mobile station 7 included in the second wireless communication system 2 conducts carrier sensing prior to transmission, in order to determine whether or not the frequency band for transmission is being used.

Figure 2:
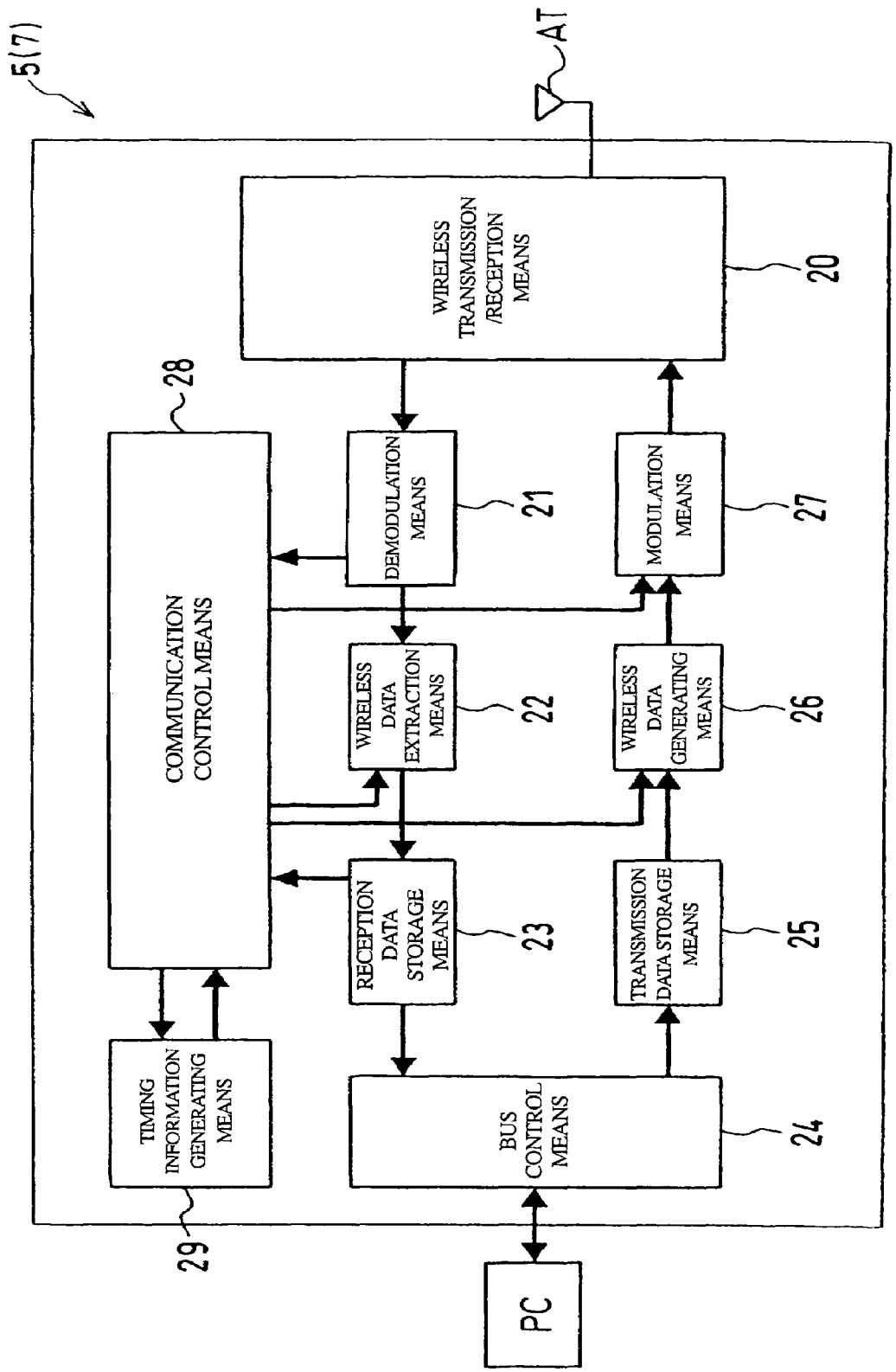
FIG. 2 shows a functional block diagram illustrating the configuration of a mobile station in the wireless communication system of the first embodiment of the invention.

FIG. 2 shows a functional block diagram of the mobile station in the second wireless communication system according to the first embodiment of the invention.

As shown in FIG. 2, the mobile station 5 or 7 includes an antenna AT, wireless transmission/reception means 20, demodulation means 21, wireless data extraction means 22, and reception data storage means 23. The mobile station 5 or 7 further includes bus control means 24, transmission data storage means 25, wireless data generating means 26, and modulation means 27. In addition, the mobile station includes communication control means 28 and timing information generating means 29.

The wireless transmission/reception means 20 carries out transmission and reception of a signal. The signal received by the wireless transmission/reception means 20 is demodulated by the demodulation means 21. The wireless data extracting means 22 extracts data from the demodulated signal. The extracted data is stored by the reception data storage means 23 as reception data. The reception data is sent to equipment with a data transmission/reception function, such as a personal computer PC, by the bus control means 24.

Meanwhile, transmission data from external equipment such as the personal computer PC is temporarily stored in the transmission data storage means 25. Based on the transmission data, wireless data is generated by the wireless data generating means 26. Wireless data modulated by the modulation means 27 is sent to the wireless transmission/reception means 20 from which it is transmitted as a signal radio wave.

The mobile station 5 or 7 further includes a communication control means 28 for controlling the entire apparatus including the aforementioned individual means, and timing information generating means 29 for generating timing information. The base station 3 also includes the same configuration as described above. The base station 3, however, is capable of transmitting control information using the wireless transmission/reception means 20.

Hereafter, the data structure of the above-described wireless communication system will be described by referring to FIGS. 3 to 6 primarily. Reference will also be made to FIGS. 1 and 2 as necessary.

Figure 3A:
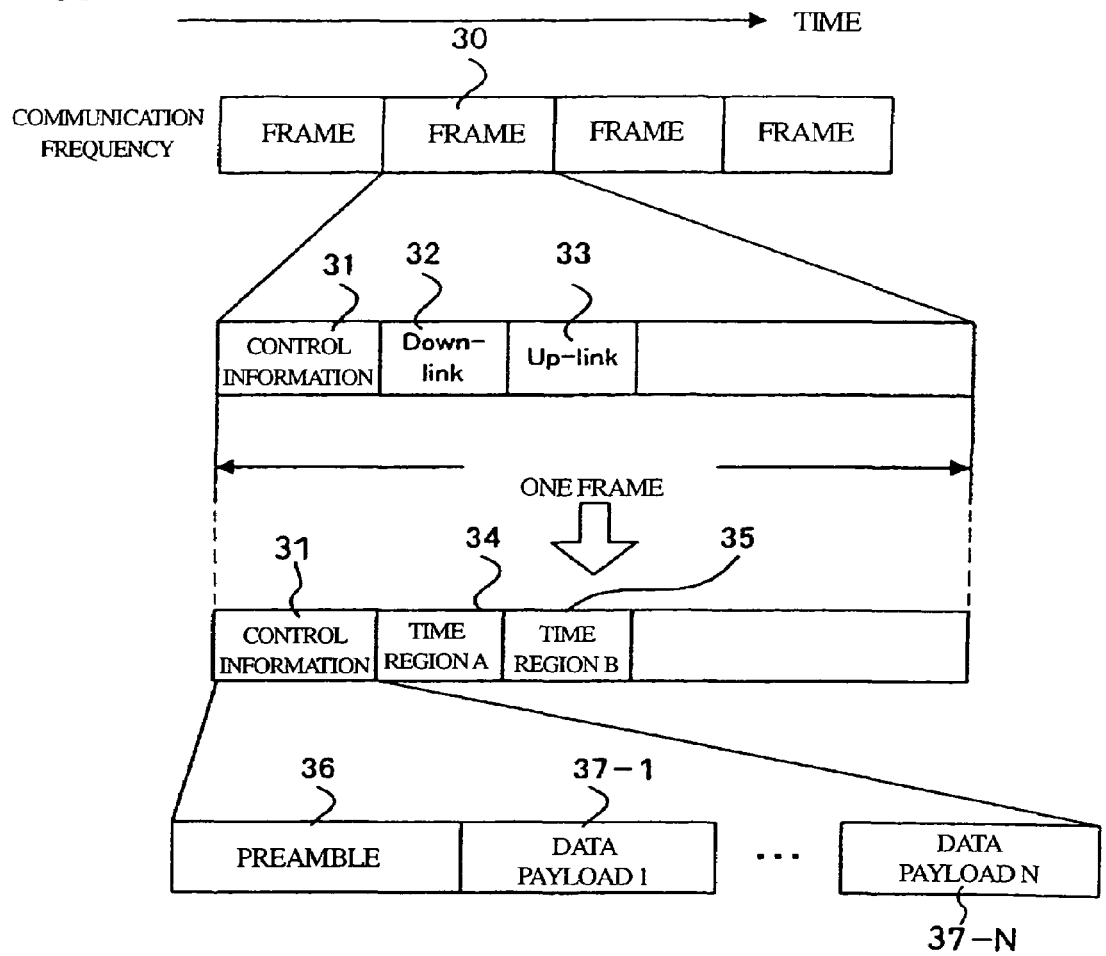
FIG. 3A shows an example of the frame structure of a first wireless communication system of the centralized control scheme in the wireless communication system of the first embodiment.
Figure 3B:
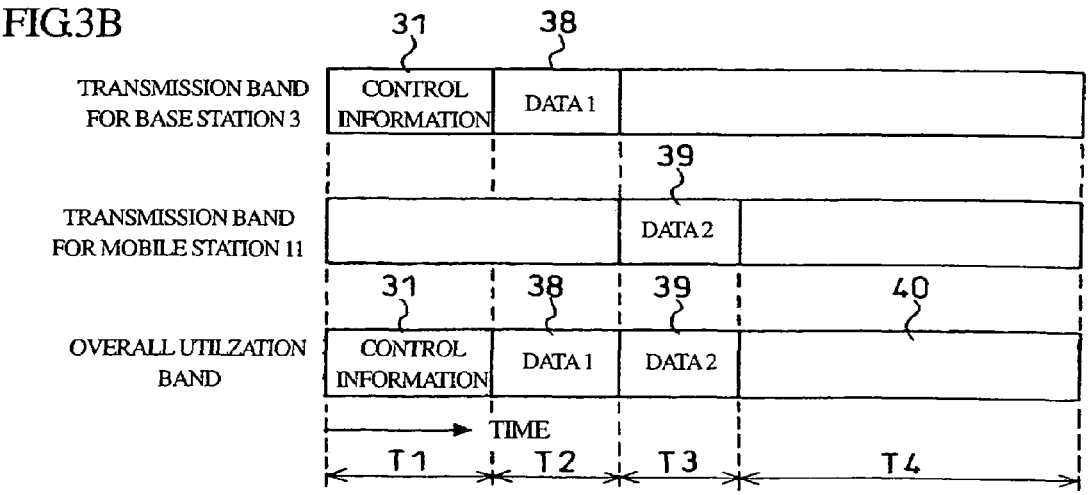
FIG. 3B shows the allocation of transmission bands in the frame.
Figure 4A:
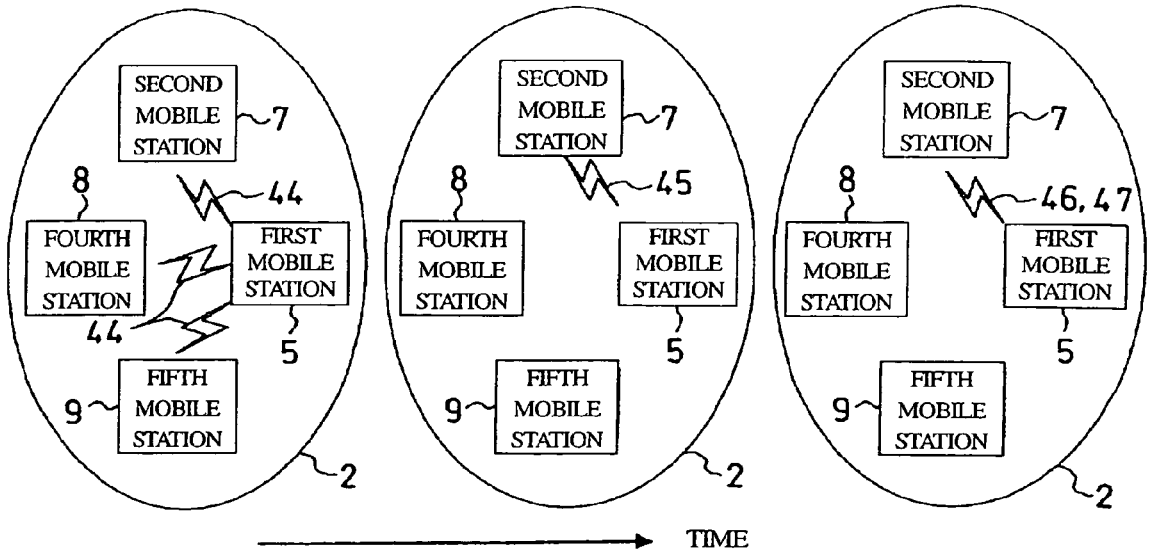
FIG. 4(a) shows an example of the configuration of a second wireless communication system (of the distributed control scheme) of the wireless communication system of the first embodiment.
Figure 4B:
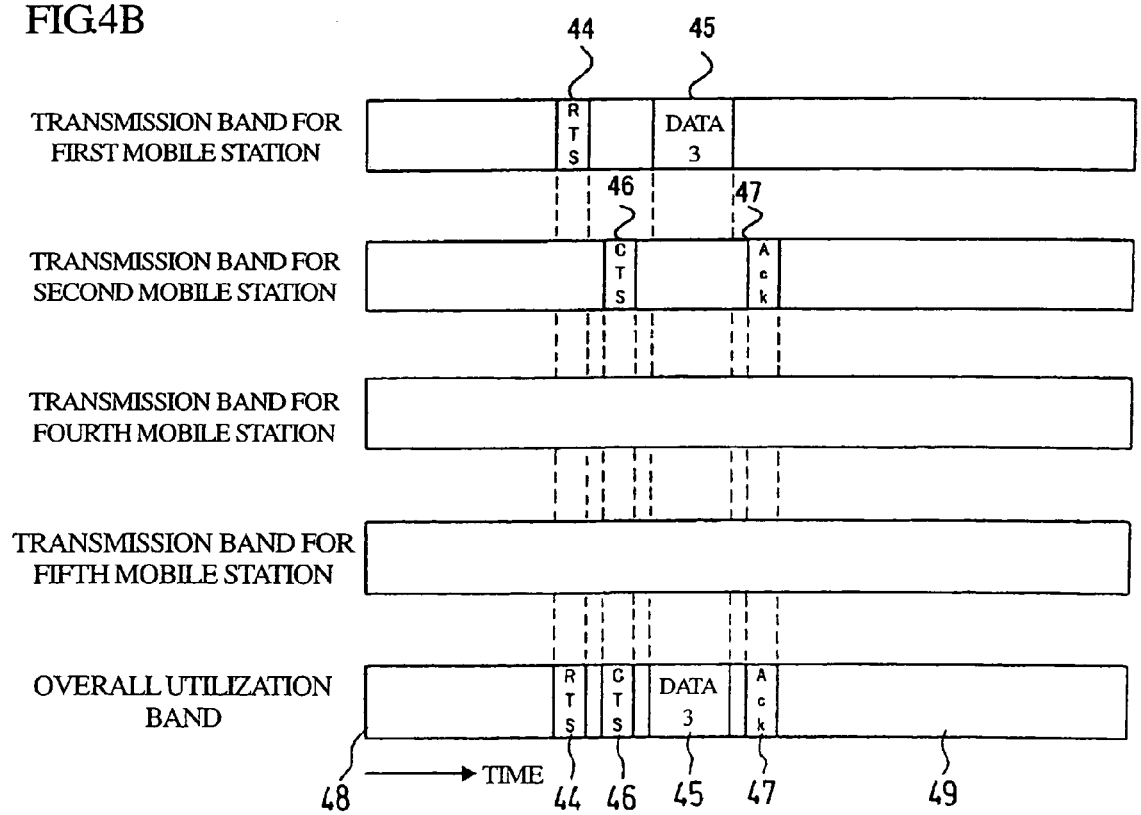
FIG. 4(b) shows the allocation of transmission bands to each mobile station.

FIG. 3 shows an example (FIG. 3A) of the frame structure of the wireless communication system (the first wireless communication system of the centralized control scheme) according to the first embodiment of the invention and the allocation of transmission bands (FIG. 3B). FIG. 4 shows an example (FIG. 4(a)) of the configuration of the wireless communication system (the second wireless communication system of the distributed control scheme) of the first embodiment and the allocation of transmission bands to each mobile station (FIG. 4(b)).

As shown in FIG. 3A, B, in the first wireless communication system of the TDMA scheme, for example, the time region in the same frequency band is divided at certain time intervals into units of individual frames 30 in order to conduct communication. Thus, the first wireless communication system 1 conducts communications in periodic frame units.

The base station 3 allocates in each frame synchronization information with which for the third mobile station 11 to be synchronized with the base station 3 and information indicating the time region allotted to the third mobile station 11. These pieces of information are referred to as control information 31. The base station 3 transmits the control information 31 to all of the mobile stations (the third mobile station 11 in the present case) within the first wireless communication system 1 including the base station 3. The frame 30 includes the control information 31, Down-link 32, which is data transmitted from the base station 3 to the mobile station 11, and Up-link 33, which is data transmitted from the mobile station 11 to the base station 3. The Down-link 32 includes data (1) 38, for example. The Up-link 33 includes data (2) 39. There is no transmission data in the time band indicated at 40.

The control information 31 is a physical signal for synchronizing the base station and the mobile station. It includes a preamble signal 36 for frame synchronization, and data payload signals 37-1 to 37-N including information about the start timing of transmission and reception for each mobile station in the frame and information about the allocation of time regions for transmission and reception.

The frame 30 is divided into a time region for transmitting the control information 31, a time region for transmitting the Down-link 32, which is data transmitted from the base station 3 to the mobile station 11, and a time region for transmitting the Up-link 33, which is data transmitted from the mobile station 11 to the base station 3.

FIG. 3B shows, from top to bottom, examples of the time region for the base station 3, the time region for the mobile station 11, and the entire communications time region in one frame in the first wireless communication system 1. In this example, one frame is divided into four time regions, namely a first to a fourth time region T1 to T4.

The first time region T1 is a time region allocated to the control information 31. The second time region T2 is a time region allocated for the transmission of the data (1) 38. The third time region T3 is a time region allocated for the transmission of the data (2) 39. The fourth time region T4 is a vacant time region where, in the first wireless communication system 1, no data is allocated. By allocating the time region to individual pieces of data, bilateral communications can be performed between the base station 3 and the mobile station 11.

The base station 3 transmits control information in the first time region T1 allocated by the control information 31 and transmits the data (1) 38 in the second time region T2. The mobile station 11 receives the data (1) 38 transmitted by the base station 3.

The mobile station 11 transmits the data (2) 39 in the third time region T3 allocated by the control information 31. The base station 3 receives the data (2) 39 transmitted from the mobile station 11.

As shown in FIG. 4(a), the second wireless communication system 2 includes the first mobile station 5 and the second mobile station 7. While not shown in FIG. 1, the second wireless communication system 2 is presumed to further include a fourth mobile station 8 and a fifth mobile station 9.

Reference is now made to FIG. 4(b) as well as FIG. 4(a). As shown in a time chart of FIG. 4(b), in the first row, when the first mobile station 5 wishes to transmit data to the second mobile station 7, it transmits an RTS (Request to send) signal 44, which is a data transmission request signal. If the second mobile station 7 normally receives the RTS signal 44, it transmits a CTS (Clear to send) signal 46, indicating it is ready to receive data. Upon reception of the CTS signal 46, the first mobile station 5 transmits a data signal (data 3) 45. The second mobile station 7 then notifies the first mobile station 5, via an ACK (Acknowledge) signal 47, of the fact that it has normally received the data signal 45.

A time interval t (IFS) between individual signals is determined by a standard called IFS (Inter Frame Space). For example, the vacant time that exists between the RTS signal 44 and the CTS signal 46 corresponds to the time interval between the individual signals.

The first mobile station 5 inserts a time band in the RTS signal 44 which is necessary for the transmission of signals RTS+CTS+data 3+ACK (including, in reality, a vacant time IFS), which time band is designated as information about a time region in which transmission is prohibited for the other mobile stations 8 and 9. Thus, the other mobile stations 8 and 9, upon reception of the RTS signal 44, stops the operation for transmission or reception of signal and are put on standby. In the second wireless communication system 2, similar operations can be performed from the second mobile station 7 to the first mobile station 3, so that a two-way wireless communication can be carried out.

In this case, if the first wireless communication system 1 and the second wireless communication system 2 share the same frequency and are located in the same area or in adjacent areas such that the radio waves transmitted from each system interfere with each other, normal transmission or reception of data might be hindered by the mutual interference between the individual networks and this could possibly lead to a reduction in data transmission efficiency or to a state where data communications is impossible.

Thus, at least one of the first mobile station 5 and the second mobile station 7 in the second wireless communication system 2 (the mobile station that is wishing to conduct data transmission) carries out an operation for receiving the control information 31 that is periodically transmitted by the base station 3 of the first wireless communication system 1, prior to data transmission. Since the control information 31 from the base station 3 in the first wireless communication system 1 is transmitted at the same frequency as that for the mobile stations 5 and 7 in the second wireless communication system 2, the mobile stations 5 and 7 in the second wireless communication system 2 can receive the control information 31 in the same area or adjacent areas where transmitted radio waves interfere with each other. In other words, the mobile stations 5 and 7 of the second wireless communication system 2 are allowed to receive the control information 31 in areas where radio wave interference is caused with the first wireless communication system 1.

Figure 5:
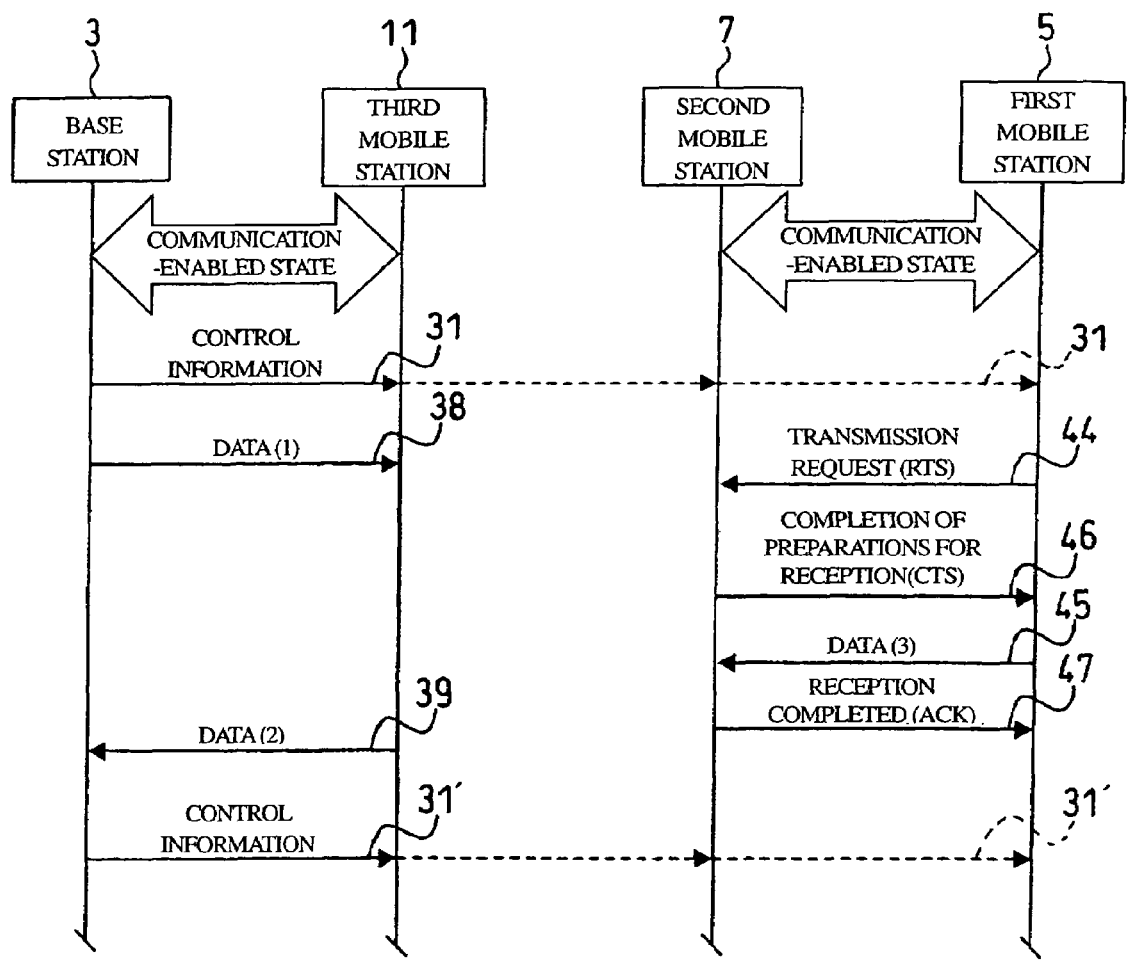
FIG. 5 shows the frame structure (a signal sequence chart) for wireless communication in the first embodiment of the invention.
Figure 6:
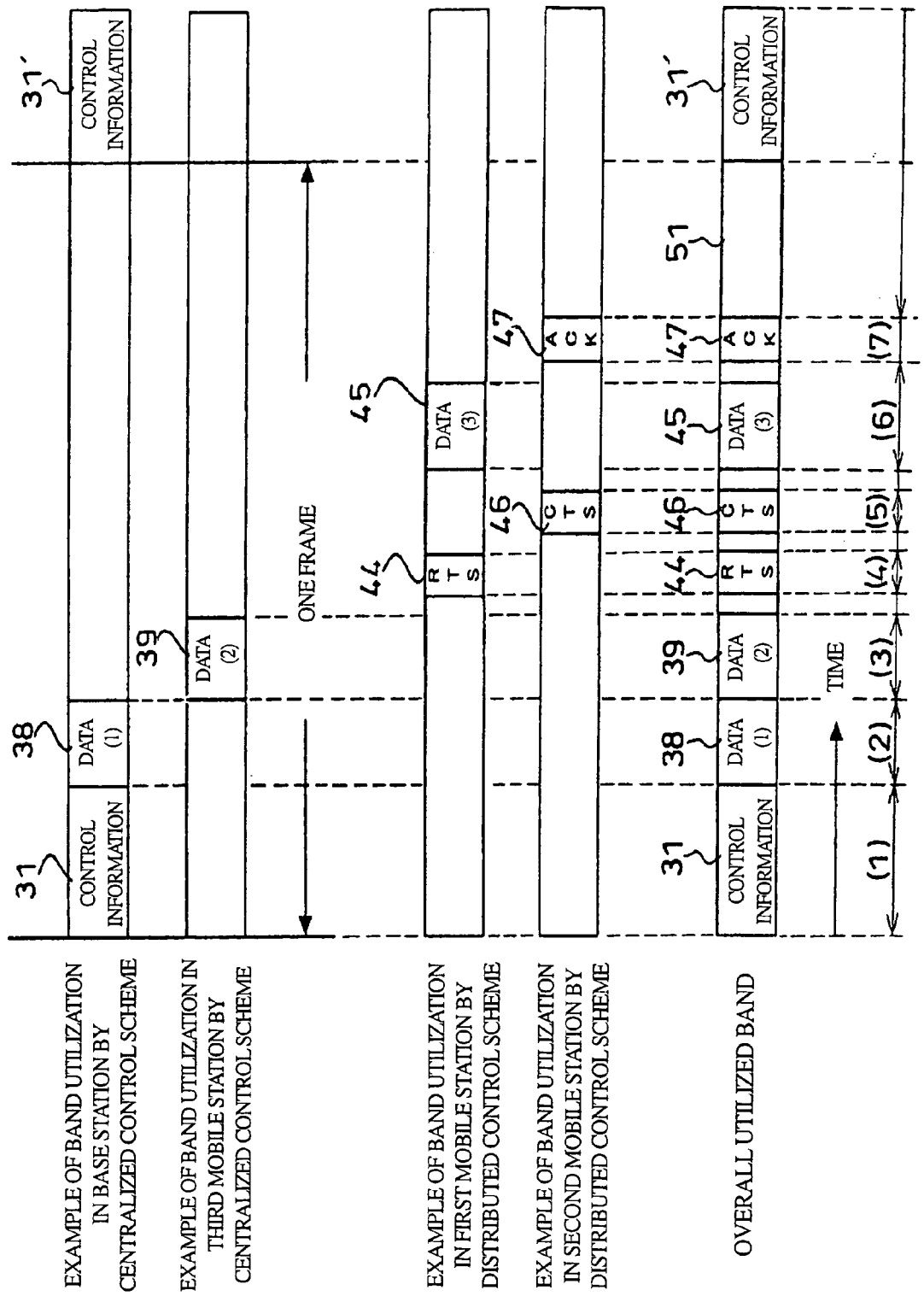
FIG. 6 shows an example of the allocation of bands (time regions) in each frame.

FIG. 5 shows the frame configuration (signal sequence chart) of a wireless communication system according to a first embodiment of the invention. FIG. 6 shows an example of band allocation (allocation of time regions) for each frame.

The figure shows that in the first wireless communication system 1, the base station 3 and the third mobile station 11 are now ready to communicate with each other following a verification operation, for example. It also shows that in the second wireless communication system 2, the first mobile station 5 and the second mobile station 7 are ready to communicate with each other.

The two time charts at the top of FIG. 6 indicate the examples of utilization of communication time bands in the centralized control scheme (the first wireless communication system). The time chart in the first row indicates the transmission utilization band for the base station 3, and the time chart in the second row indicates the transmission utilization band for the third mobile station 11. The time charts in the third and fourth rows indicate the examples of utilization of communication time bands in the distributed control scheme (the second wireless communication system), of which the time chart in the first row indicates the transmission utilization band for the first mobile station 5 and the time chart in the second row indicates that for the second mobile station 7.

First, the base station 3 transmits the control signal 31 in a time band (1), thus announcing time bands (2) and (3) used by the first wireless communication system 1 of the centralized control scheme. In a time band (2), the base station 3 transmits data (1) 38 to the third mobile station 11, which in turn transmits data (2) 39 to the third mobile station 11 in a time band (3). By these operations, a two-way wireless communication based on the centralized control scheme can be realized.

On the other hand, in the second wireless communication system 2, the following operations are carried out.

The first mobile station 5 transmits the data transmission request (RTS) signal 44 including a request for allocation of transmission time band, to the second mobile station 7 in a time band (4).

The base station 3 detects a request for time allocation included in the data signal 39 from the third mobile station 11 in its own system (the first wireless communication system of the centralized control scheme).

At least one of the first and second mobile stations 5 and 7 receives the control signal 31 and thereby identifies a vacant time region (the time region subsequent to (4) in the single frame in FIG. 6) that is not used by the first wireless communication system 1.

In response to the RTS signal from the first mobile station 5, the second mobile station 7 transmits the reception preparation completion signal CTS 46 in a time band (5). The first mobile station 5 transmits data (3) 45 in a time band (6). The second mobile station 7 transmits in a time band (7) the data reception completion signal ACK 47. As shown in the chart at the bottom of FIG. 6, there is no overlap in the transmission utilization time region at the same frequency.

In accordance with the above-described flow of operation, the interference can be reduced between data communications in the second wireless communication system 2 of the distributed control scheme and those in the first wireless communication system 1 of the centralized control scheme. Thus, it will be seen that interference can be avoided. Thus, two wireless communication systems using different wireless communication systems can coexist and, additionally, the frequency band that is used can be efficiently utilized.

The RTS signal and CTS signal are provided as means for avoiding interference between mobile stations in the second wireless communication system 2 of the distributed control scheme. The wireless communication system according to the present embodiment may be also applied in cases where data signal is directly transmitted without transmitting the aforementioned signals. Further, the system may be also applied in cases where the second wireless communication system comprises not only mobile stations of the distributed control scheme but also mobile stations or base station of the centralized control scheme as wireless communications equipment that belong to the system. In such a case, the base station in the second wireless communication system 2 can calculate the vacant time region based on the control information 31 of the first wireless communication system and then notify the other mobile stations in the second wireless communication system.

Figure 7:
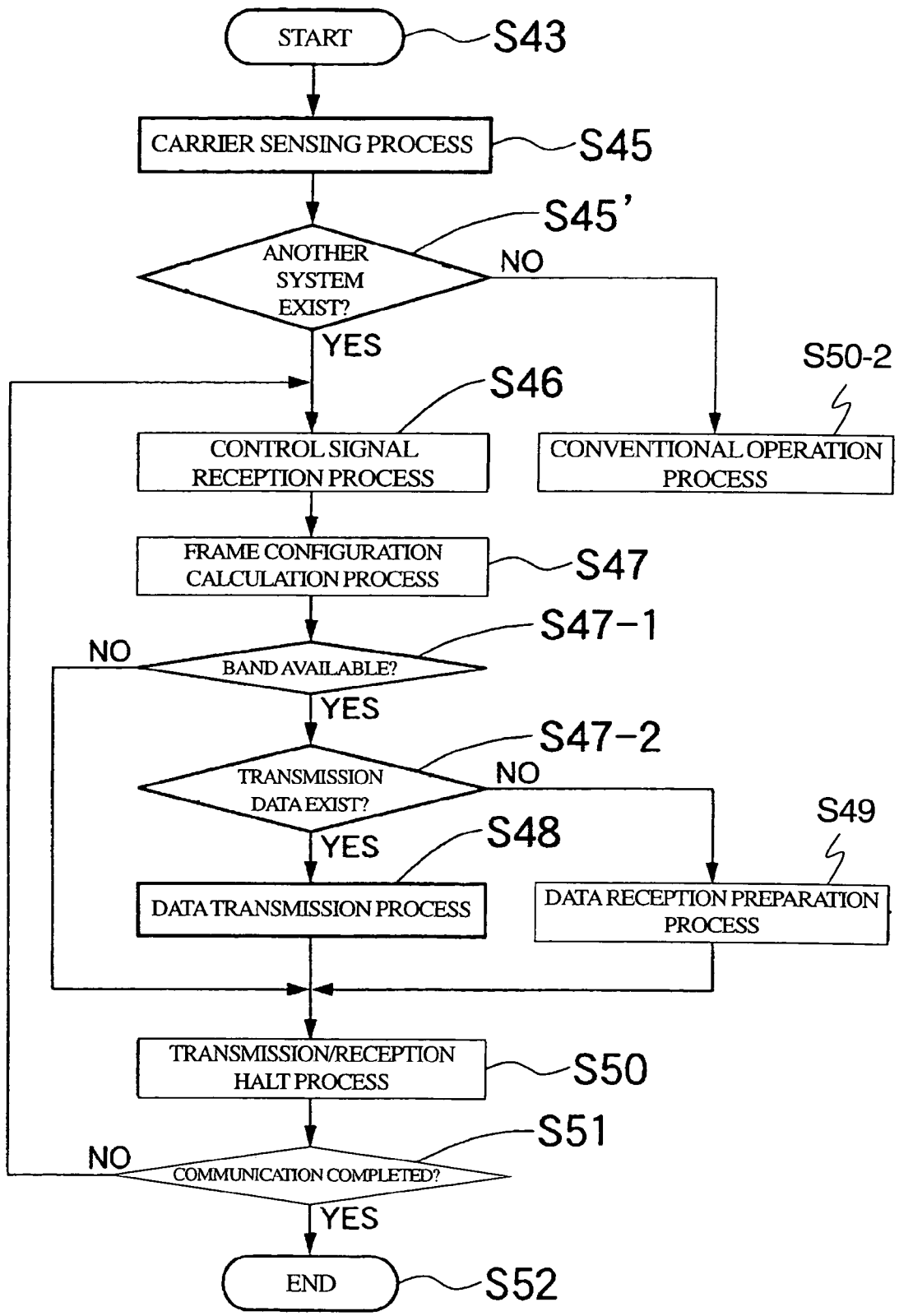
FIG. 7 shows a flowchart of the operation of a first mobile station in the distributed control system (the second wireless communication system) in the wireless communication system of the first embodiment of the invention.

FIG. 7 shows a flowchart of the operation of the first mobile station (FIG. 1) in the wireless communication system of the first embodiment. Hereafter, the operation of the mobile station in the wireless communication system will be described by referring to mainly FIGS. 2 and 7.

In step S43, the first mobile station 5 (FIG. 1) in the second wireless communication system 2 (FIG. 1) starts the operation for data transmission. Then, in step S45, the mobile station performs a carrier sense process. In the carrier sense process, it is determined, using the wireless transmission/reception processing means 20 and demodulation means 21 (FIG. 2), whether there are radio waves other than that of the second wireless communication system 2. Namely, in step S45', it is determined whether or not there is another system.

If the preamble signal 36 of the control information 31 of the base station 3 in the first wireless communication system 1 is captured in step S45', that fact is notified to the communication control means 28, whereupon a control signal reception process in step S46 is initiated. Simultaneously, the communication control means 28 notifies the timing generation means 29 of the frame head by the preamble, and the timing generation means 29 counts the time elapsed in the frame using an internal counter in order to achieve frame synchronization.

If the preamble signal 36 is not captured in step S45', namely no other systems are identified, the first mobile station 5 determines that there is no other wireless communication systems and carries out the operation processing by the conventional distributed control shown in step S50-2.

The control signal 31 is a signal intended for all of the mobile stations in the wireless communication system and is therefore generally not encrypted. However, in case the reception signal is processed by a scrambler or the like, an initial value of the scrambler is obtained from the received control signal 31, and the scramble is deactivated by a descrambler provided in the wireless data extraction means 22. Then, the control information 31 is decrypted to extract data such as the band allocation information in the frame that is utilized for transmission, and the thus obtained data is stored temporarily in the reception data storage means 23.

The routine then proceeds to step S47, where a frame configuration calculation process is performed. In the frame configuration calculation process, the communication control means 28 first calculates, based on the control information 31 temporarily stored in the reception data storage means 23, a time region that is utilized by the first wireless communication system 1 in the frame and a vacant time region in the frame that is not utilized. Further, in step S47-1, it is determined whether the vacant time region obtained as a result of the calculation has a minimum length necessary for data transmission and reception by the second wireless communication system 2. In the present embodiment, the minimum length necessary for the second wireless communication system 2 to conduct data transmission and reception, i.e. the length necessary for the transmission of RTS signal+CTS signal+minimum data+ACK signal, is used as the reference for the determination of the minimum necessary length. The recognition is made by distinguishing between a vacant time region that can be used by the second wireless communication system 2 for data transmission and reception, and a communication-disabled time region that cannot be utilized.

Thereafter, in step S47-1, based on the result of the frame configuration calculation process in step S47, it is determined whether or not there is a vacant time region in the frame in which the second wireless communication system 2 can transmit or receive. If there is no vacant time region, the routine proceeds to step S50 where the transmission or reception process is halted until the end of the frame. For example, based on the information from the timing information generating means 29, the communication control means 28 halts the supply of electric power to portions that are not used, such as the wireless transmission/reception means 20, modulation means 27 and demodulation means 21, until the process for receiving control information for the next frame is initiated. In this way, reductions in power consumption in the mobile station can be achieved.

If it is determined that there is a vacant time region (band) in step S47-1, the first mobile station 5 determines if transmission data has been passed via the bus control means 24 and stored in the transmission data storage means 25 (such as in the case where a wireless LAN card is the mobile station and a notebook personal computer with the wireless LAN card inserted therein has transmitted transmission data to the transmission buffer of the card using a bus controller).

If it is determined in step S47-2 that there is transmission data, the routine proceeds to step S48 for the data transmission process, where the communication control means 28 calculates the time it would take for the transmission of the RTS+CTS+DATA+ACK signals, based on the transmission data. If the time it takes for transmission is more than the vacant band, the transmission data stored in the transmission data storage means 25 is divided by the wireless data generating means 26 and thus converted into wireless packets for transmission of a size such that they can be put in the vacant band. Further, based on the counter information in the timing information generating means 29 indicating the time in the frame, the vacant band head time in the frame is determined and the start of transmission is notified to the modulation means 27.

If it is determined in step S47-2 that there is no transmission data, the routine proceeds to step S49, where the first mobile station 5 prepares for the reception of data transmitted from the mobile station (mobile station 7) in the second wireless communication system (data reception preparation process).

If, during the data transmission process (step S48) and the data reception preparation process (step S49), there exist vacant time regions and communication-disabled time regions alternately in time, a power supply halt is carried out in which the length of the communication-disabled time region is set in advance. Specifically, if the length is sufficient for the halting of transmission and reception and is longer than a valid length for the halting of transmission and reception, the communication control means 28 performs a transmission/reception halt process in the communication-disabled time region as well, so that reductions in power consumption in the mobile station can be achieved. Further, if there is no longer a vacant time region in the frame, the routine proceeds to step S50 where a transmission/reception halt process is conducted in the remaining time region in the frame.

After the end of the frame, if wireless communications is to be conducted further, the routine returns from step S51 to step S46 where the process for receiving control signal from the base station 3 in the first wireless communication system 1 is performed.

In the data transmission process (step S48), upon reception of the RTS signal 44, the second mobile station 7 transmits the CTS signal 46, in accordance with the frame configuration chart of FIG. 6, thus notifying the completion of preparations for reception. The first mobile station 5, upon reception of the CTS signal, then transmits data (3) 45. If the data is correctly received, the second mobile station 7 sends ACK signal 47 to the first mobile station 5, thus notifying it of the completion of reception.

Thus, two wireless communication systems can be made to coexist without interference, as will be seen from the example of the overall utilization band shown at the bottom of FIG. 6.

As described above, in accordance with the wireless communication system of the first embodiment of the invention, the communication time band of the second wireless communication system is allocated to a vacant region in its own communication time band, so that the time band can be effectively utilized.

The inventors then did the following analysis. The second wireless communication system transmits a control signal including its own communication request time band to the first wireless communication system. The base station of the first wireless communication system then analyzes the received control signal to obtain the communication request time band information from the second wireless communication system. Based on the result of analysis, the base station in the first wireless communication system readjusts the communication-enabled time region such that its own (the first wireless communication system's) communication-enabled time region does not overlap the communication-enabled time region for the second wireless communication system. The first wireless communication system transmits a control signal including the thus readjusted communication-enabled time bands to the second wireless communication system.

In case the communication-enabled time band of the base station in the first wireless communication system and that for the second wireless communication system cannot be readjusted, the control signal transmitted to the second wireless communication system may include an instruction to the effect that no communication permission should be granted to the second wireless communication system.

The second wireless communication system receives the control signal including the communication-enabled time band of the first wireless communication system, analyzes the received control signal, and extracts the communication-enabled time band. Based on the extracted communication-enabled time band, the second communication system allocates its own (the second wireless communication system's) communication time band. By allocating a time band in the frame in which no communications occur (communications vacant time band) as the communication time band, the communication vacant time band can be reduced. Accordingly, the utilization efficiency of the first and second wireless communication systems can be improved.

Based on the above considerations, a wireless communication system according to a second embodiment of the invention will be described by referring to FIGS. 8 to 10. Reference will also be made to FIGS. 1 to 6 as necessary, which commonly pertain to the wireless communication system of the second embodiment.

Figure 8:
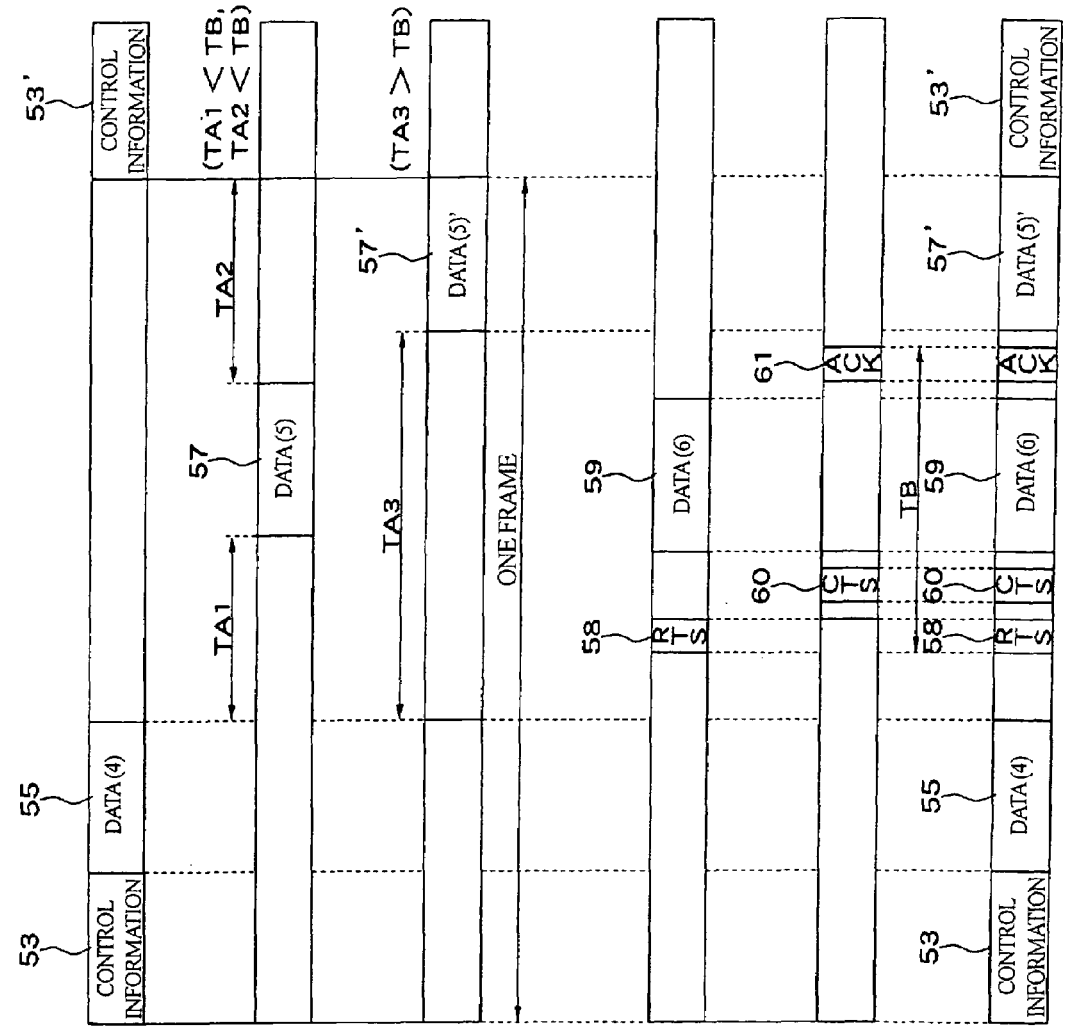
FIG. 8 shows an example of the allocation of bands in each frame in the wireless communication system according to a second embodiment of the invention, where the allocation of time regions is readjusted.

FIG. 8 shows time charts for the explanation of a technique for readjusting time between the first and second wireless communication systems 1 and 2. FIGS. 9 and 10 show flowcharts illustrating the operation of the base station in the first wireless communication system and the mobile station in the second wireless communication system, with a view to avoiding mutual interference between the first and second wireless communication systems and reductions in data transmission efficiency.

In the second embodiment, the base station 3 defines individual time bands for the first and second wireless communication systems based on the time band width which its own system wishes to utilize and the time band width which the second wireless communication system of the distributed control scheme wishes to utilize, such that radio waves can be most efficiently utilized. Then, the base station 3 notifies the first mobile station 5 via control information of a communication-allowed time band. However, if the time band width utilized by the first wireless communication system 1 of the centralized control scheme is long and there is no sufficient vacant time region, the first mobile station 5 is notified of a communication-disallowing signal via the control information 31 indicating that no communications are allowed.

Details will be described below.

Figure 9:
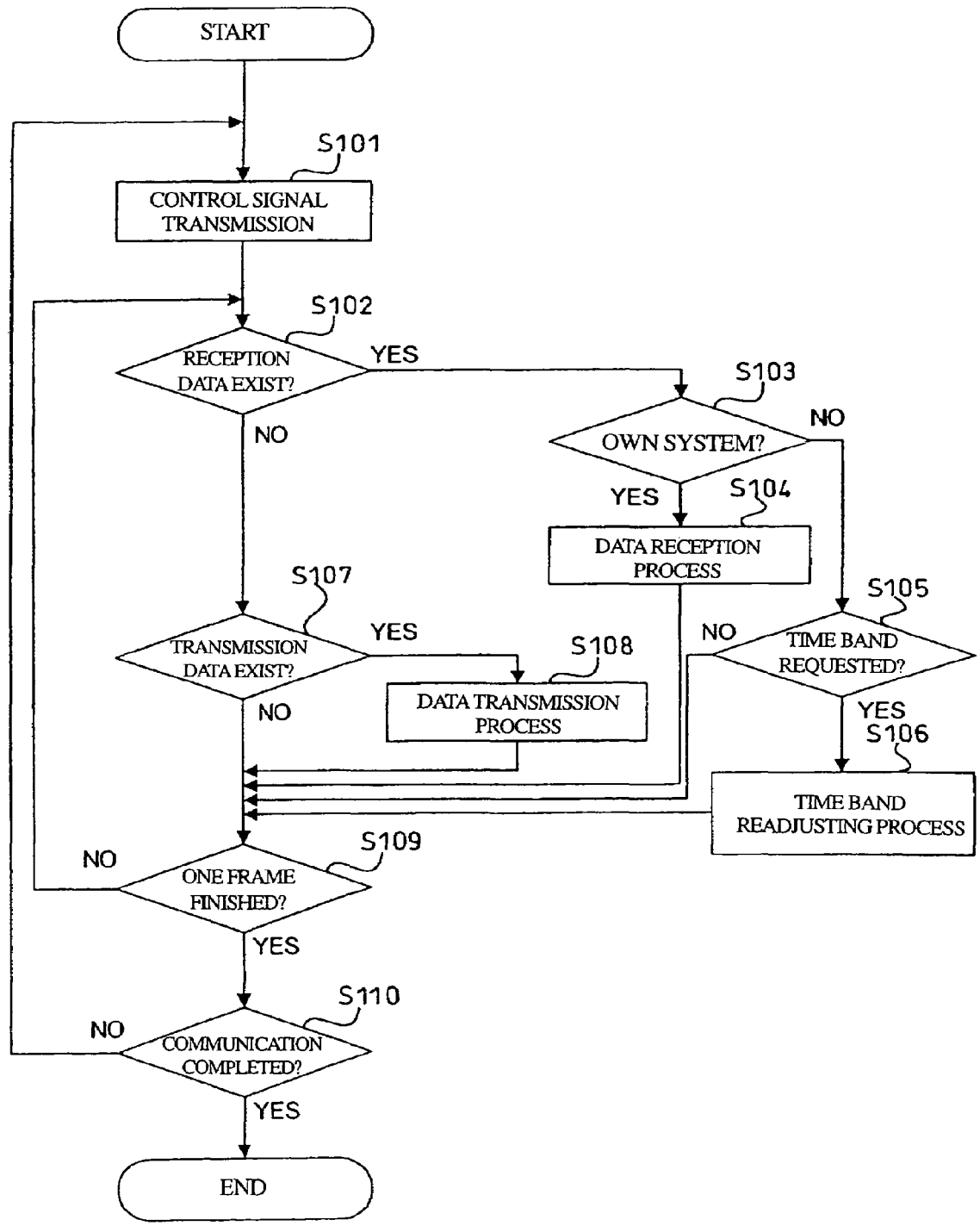
FIG. 9 shows a flowchart of the operation of a base station (the first wireless communication system) in the wireless communication system of the second embodiment.

As shown in FIGS. 8 and 9, the mobile station 3 of the first wireless communication system 1 transmits a control signal in step S101. In step S102, it is determined whether or not there is received data. If there is received data in step S102, the routine proceeds to step S103. It is then determined in step S103 whether or not the received data is that within its own system (the first wireless communication system 1). If the received data is that within its own system in step S103, a data reception process is performed in step S104. The routine then proceeds to step S109, where it is determined whether or not a single frame has ended. If a single frame has not ended in step S109, the routine returns to step S102 where the presence or absence of received data is determined. If a single frame has ended in step S109, the routine proceeds to step S110, where it is determined whether or not communication is to be completed. If not, the routine returns to step S101.

In step S103, if the received data is that outside of its own system (namely, data of the second wireless communication system 2), the routine proceeds to step S105 where it is determined whether the opposite party (the second wireless communication system 2) is demanding a time band in a frame. If the opposite party (the second wireless communication system 2) is not demanding a time band, the routine proceeds to step S109. If the opposite party (the second wireless communication system 2) is demanding a time band in step S105, the routine proceeds to step S106 where the allocation of time bands in the frame is readjusted. After the readjustment of the time bands in step S106 is over, the routine then proceeds to step S109.

If in step S102 there is no received data, the routine proceeds to step S107 where the presence or absence of transmission data is determined. If there is transmission data, the routine proceeds to step S108 where a data transmitting process is performed. Thereafter, the routine proceeds to step S109.

Figure 10:
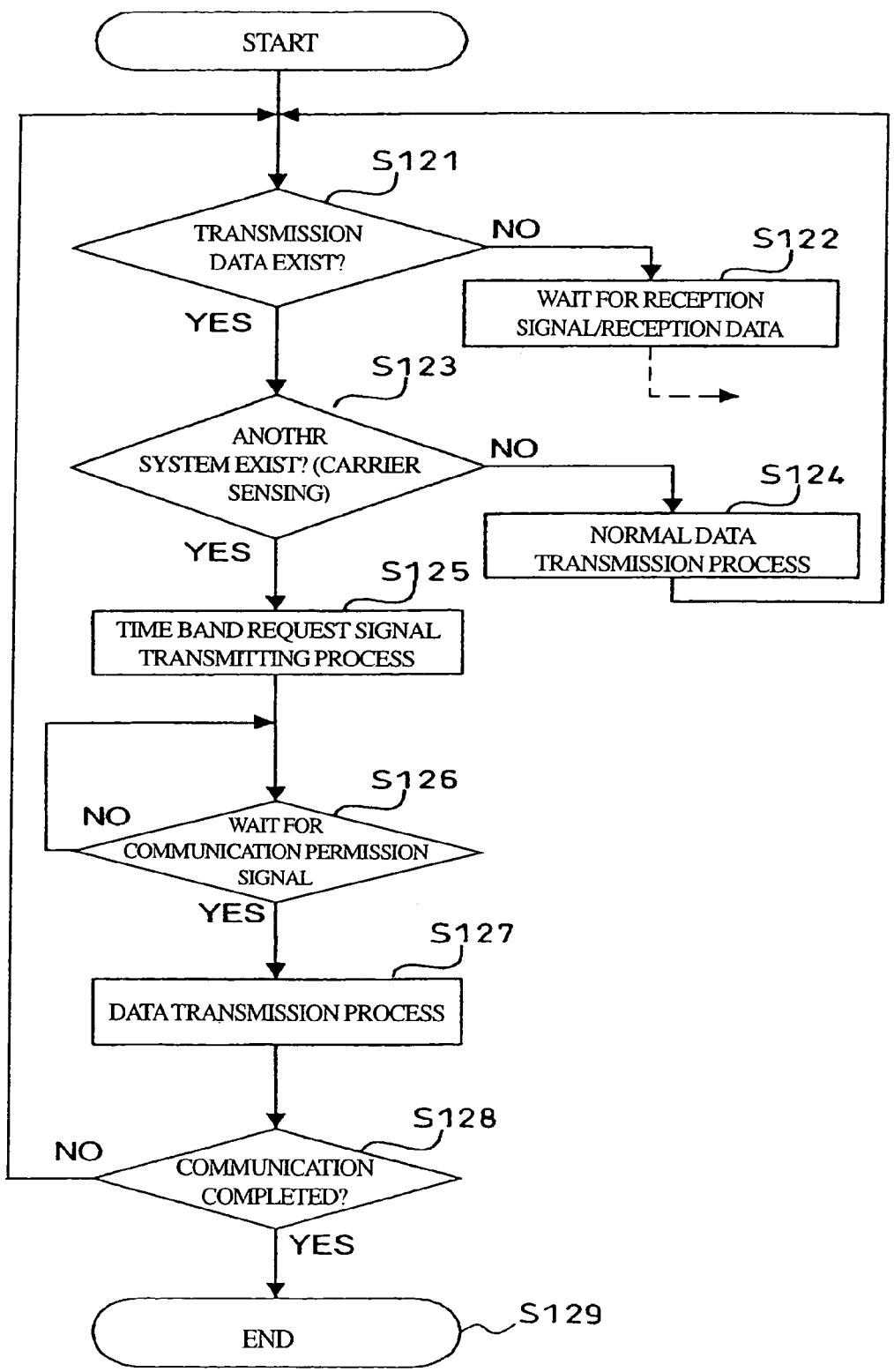
FIG. 10 shows a flowchart of the operation of a first mobile station (the second wireless communication system) in the wireless communication system of the second embodiment.

As shown in FIG. 10, the mobile station of the distributed scheme determines in step 121 whether or not there is transmission data. If there is no transmission data, the mobile station is put on standby in step S122 where it waits for a reception signal or received data. If there is transmission data in step S121, the mobile station determines, based on carrier sensing, whether or not the first wireless communication system 1 exists within a communication-enabled region of the second wireless communication system 2. If the first wireless communication system 1 is not present, a normal data transmission process is carried out in step S124 and then the routine returns to step S121.

In step S123, if it is determined that the first wireless communication system 1 exists within the communication-enabled range of the second wireless communication system 2, the routine proceeds to step S125. In step S125, the mobile station transmits a signal to the first wireless communication system 1 demanding a time band for the transmission of transmission data. As shown in step S105 of FIG. 9, when the base station 3 receives the time band request signal, the time-band readjusting process is carried out in step S106. Thereafter, one of the mobile stations 5 and 7 (the transmitting side) waits for a communication allowing signal.

When the mobile station receives the communication allowing signal in step S126, the mobile station transmits data in the readjusted time band in step S127. Then, the routine proceeds to step S128 where it is determined whether or not the communication is to be completed. If not, the routine proceeds to step S121. If the communication is to be completed, the routine proceeds to step S129.

The operations will be described in more detail by referring to the time charts of FIG. 8 and the flowcharts of FIGS. 9 and 10.

Of the first mobile station 5 and second mobile station 7 in the second wireless communication system 2, the transmitting mobile station attempts to receive a control signal 53 periodically transmitted by the base station 3 of the first wireless communication system, prior to data transmission. Since the control signal 53 is transmitted from the base station 3 of the first wireless communication system 1 at the same frequency band as the frequency used by the second wireless communication system 2, the mobile stations 5 and 7 of the second wireless communication system can receive (monitor) the signal. Thus, the first mobile station 5 of the second wireless communication system 2 determines in the carrier sense process (step S123) of FIG. 9 whether or not there exist radio waves other than that of the second wireless communication system 2. If a preamble signal (see FIG. 3A) of the control information 53 (step S101) transmitted by the base station 3 of the first wireless communication system 1 is captured, the mobile station carries out a process for transmitting a time band request signal (step S125), thus notifying the base station 3 of the first wireless communication system 1. The base station 3 of the first wireless communication system 1 then decodes the time band request signal transmitted by the first mobile station 5 of the second wireless communication system 2 one frame previously, and readjusts the requested signal time band for the second wireless communication system 2 and the necessary communication time band for the first wireless communication system 1, thus attempting to achieve a matching (step S106).

Thus, the base station 3 of the first wireless communication system 1 sends the control information 53 to the other stations in the first wireless communication system 1 (step S101). The control information 53 also reaches the second wireless communication system 2. The first mobile station 5 of the second wireless communication system 2 starts a process for receiving the control signal 53, while the communication control means 28 (FIG. 2) notifies the timing generating means 29 of the frame head by a preamble. The timing generating means 29 achieves frame synchronization by counting the elapsed time in the frame using an internal counter.

Since the control signal 53 is a signal intended for all of the mobile stations in the wireless communication systems, it is not generally encrypted. However, if the received signal is processed by scrambling, for example, the initial value of the scrambler is extracted from the received control signal and the scramble is lifted using the descrambler in the wireless data extraction means 22, thus decoding the control information and extracting and obtaining data such as the information about band allocations in the frame used for transmission. The data is then temporarily stored in the reception data storage means 23.

Next, the communication control means 28 calculates a vacant time region in the frame based on the temporarily stored control information 53.

The vacant time region in the frame is the time region in one frame from which the control information 53 of the base station, the transmission data (4) 55, and the transmission data (5) 57 of the third mobile station are removed. For example, in FIG. 8, it is now supposed that a first vacant time region TA1 and a second vacant time region TA2 exist, the former being located between the end of the time region for the transmission data (4) 55 of the base station 3 of the first wireless communication system 1 and the beginning of the time region for the transmission data (5) 57 for the third mobile station 5 of the first wireless communication system 1, the latter between the end of the time region for the transmission data (5) 57 of the third mobile station 5 and the end of the one frame. In this case, the total of the vacant time regions in the frame is expressed as a sum of the first and second vacant time regions TA1 and TA2 (TA1+TA2).

If the sum of the vacant time regions (TA1+TA2) does not reach the minimum time region width required by the second wireless communication system 2 for transmission (RTS58+CTS60+data (6) 59+ACK 61, plus the vacant time regions (ITF) between the individual signals: TB), normally the second wireless communication system 2 does not perform data transmission or reception in that frame. Thus, in that case, the transmission/reception process halt process is performed continuously until the end of the frame.

In this state, the supply of electric power to portions (transmission/reception means), such as the wireless transmission/reception means 20, modulation means 27 and demodulation means 21, may be terminated, so that reductions in power consumption in the mobile station can be achieved.

If the sum (TA1+TA2) of the vacant time regions in one frame is more than the minimum time region width TB required by the second wireless communication system for transmission, the first mobile station 5 of the second wireless communication system 2 can transmit.

If the minimum time region width TB is shorter than either the first vacant time region TA1 or the second vacant time region TA2, the minimum time region width TB may be allocated to the time region of either the first or the second vacant time region TA1 or TA2 that is long enough, as in the case of the first embodiment.

If, on the other hand, the minimum time region width TB is longer than both the first vacant time region TA1 and the second vacant time region TA2 but is shorter than TA1+TA2, as shown in FIG. 8, the allocations of time band are readjusted.

For example, as indicated by the data (5)' 57' in the data transmission time allocation for the third mobile station 11 after adjustment, the data transmission time for the third mobile station 11 can be shifted to the time region at the end of the frame. In this way, there can be created between the end of the transmission end time of the data (4) 55 and the data transmission start time for the data (5)' 57' a third vacant time region TA3 which is longer than the minimum time region width TB. The minimum time region width TB can then be allocated within the third vacant time region TA3, thereby allowing communications between the first and second mobile stations 5 and 7.

In this time band, the second wireless communication system 2 determines whether transmission data has been transferred via the bus control means 24 to the transmission data storage means 25 and stored therein. For example, a notebook personal computer with a wireless LAN card inserted therein as a mobile station transmits data to the transmission buffer of the wireless LAN card, using a bus controller.

The second wireless communication system 2 conducts communications during the data transmission process (step S127) in the third vacant time region TA3.

If the minimum time region width TB is more than the vacant band, the transmission data stored in the transmission data storage means 25 may be divided by the wireless data generating means 26 and thus converted into wireless packets for transmission of a size such that they can be put in the vacant band. Besides the method of dividing into packets that can be accommodated in the vacant time region, if the vacant time band is lacking, the communication for its own (first) wireless communication system may be given priority while giving the other party (second wireless communication system) no permission for communication. Further, based on the counter information in the timing information generating means 29 indicating the time in the frame, the head time in the vacant time band in the frame is determined and the start of transmission is notified to the modulation means 27.

If there is no transmission data, the first mobile station 5 conducts a data reception preparation step (step S122) and thus prepares for the reception of data from the second mobile station 7 in the second wireless communication system 2.

If after these processes there exists a vacant time region in the frame, the routine returns to the step of determining whether or not there is transmission data (step S121). If there is no vacant time region in the frame, the transmission/reception halt process is conducted in the remaining time in the frame.

After the end of the frame, if wireless communications is to be conducted further, the routine returns to the process of transmitting a time band request signal from the first mobile station 5 of the second wireless communication system 2 (step S125).

In the data transmission process (step S127), upon reception of the RTS signal 44 by the second mobile station 7 of the second wireless communication system 2 in accordance with the frame configuration chart of FIG. 6, the second mobile station 7 transmits the CTS signal 46, thus notifying the completion of preparations for reception. The first mobile station 5 of the second wireless communication system 2, upon reception of the CTS signal 46, then transmits data (3) signal 45. If the data (3) signal 45 is correctly received, the second mobile station 7 sends ACK signal 47 to the first mobile station 5, thus notifying it of the completion of reception.

By performing the above processes, the two wireless communication systems can coexist without mutual interference, as shown in the example of the overall utilization band in the time chart at the bottom of FIG. 6.

As described above, in accordance with the wireless communication system of the second embodiment of the invention, the communication time band of its own and the communication-enabled time band of the second wireless communication system can be readjusted so that the time band can be more effectively utilized.

Figure 11:
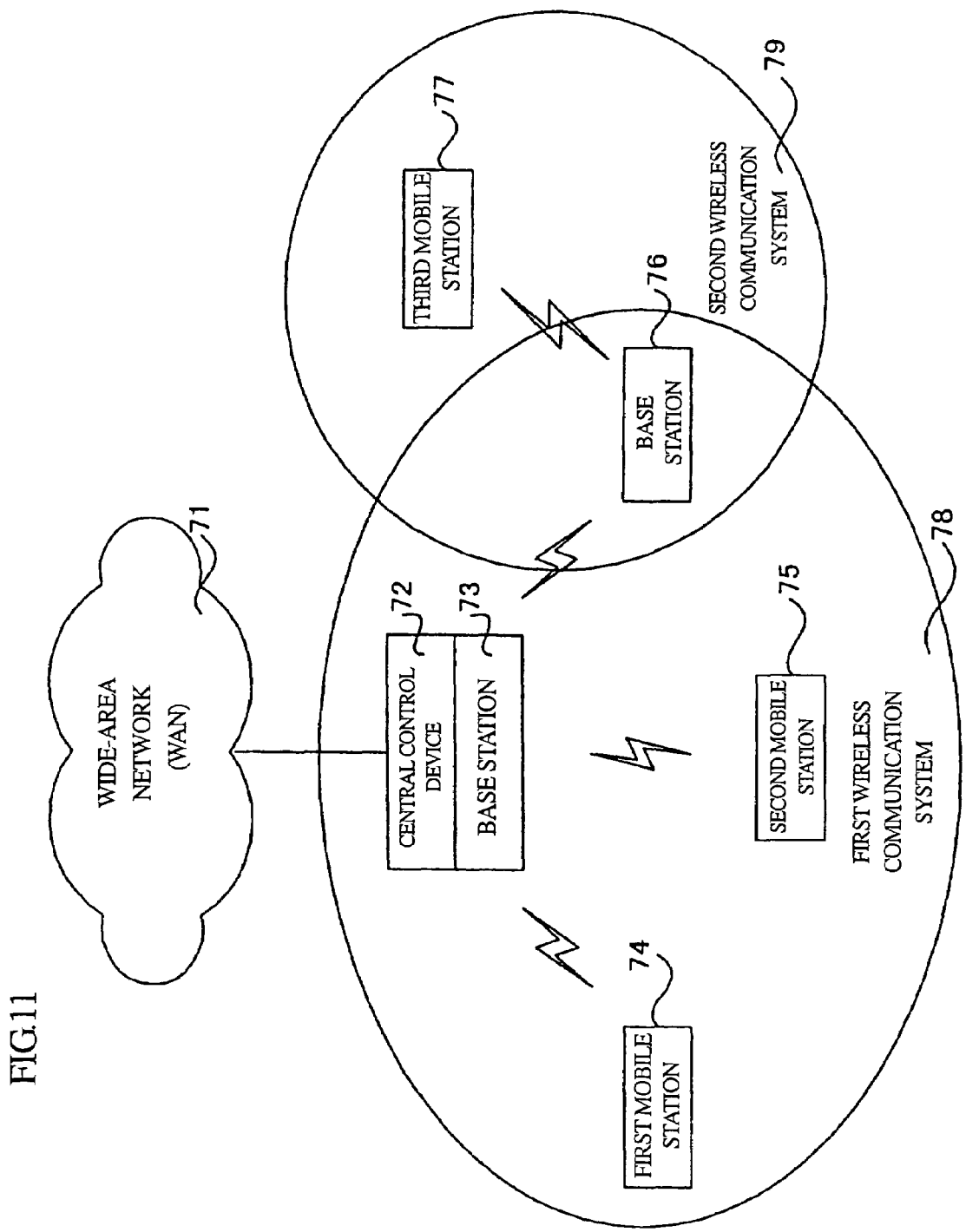
FIG. 11 shows the configuration of a wireless communication system according to a third embodiment of the invention.
Figure 12:
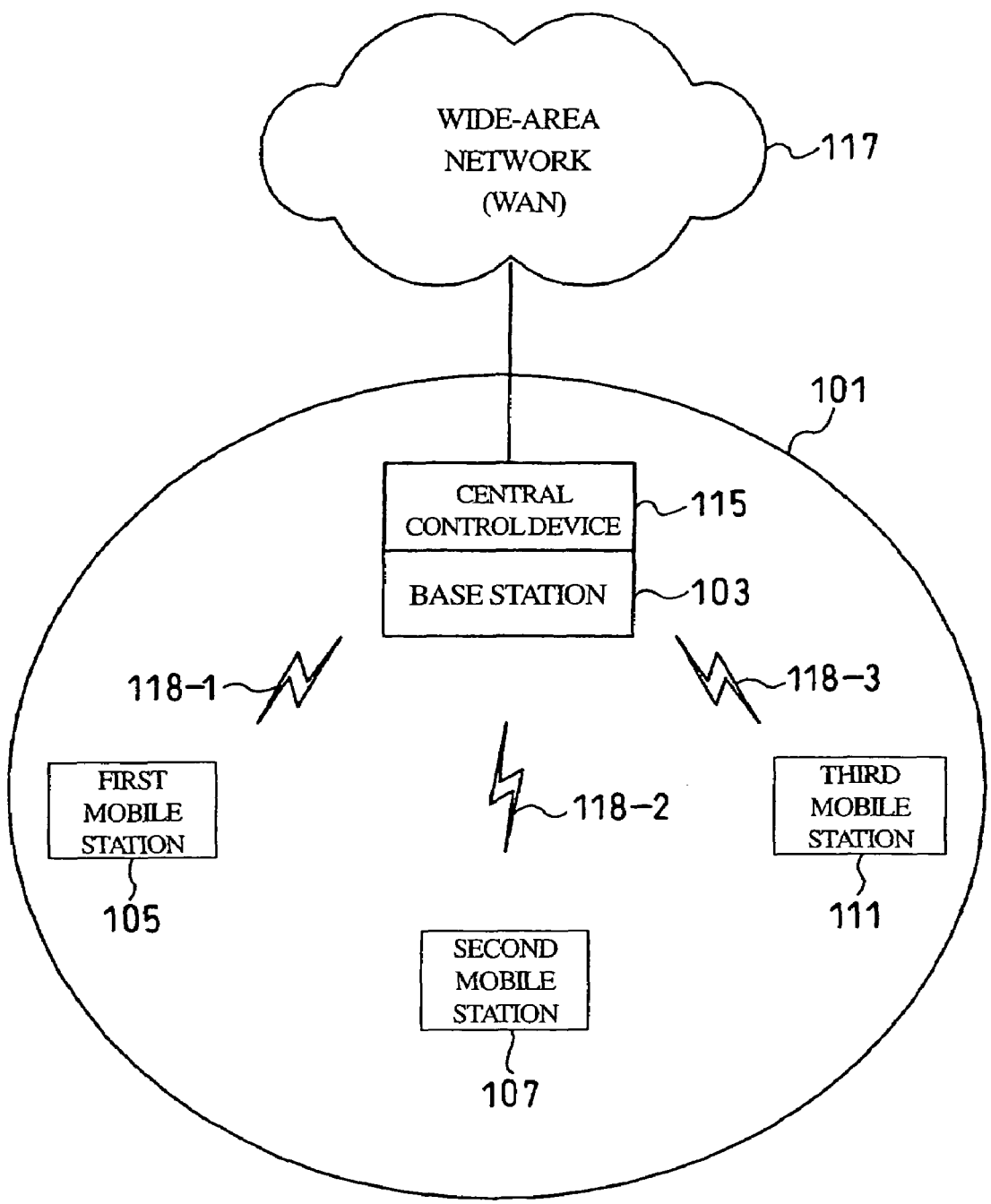
FIG. 12 shows the configuration of a wireless communication system of a conventional centralized control scheme based on the TDMA scheme.
Figure 13:
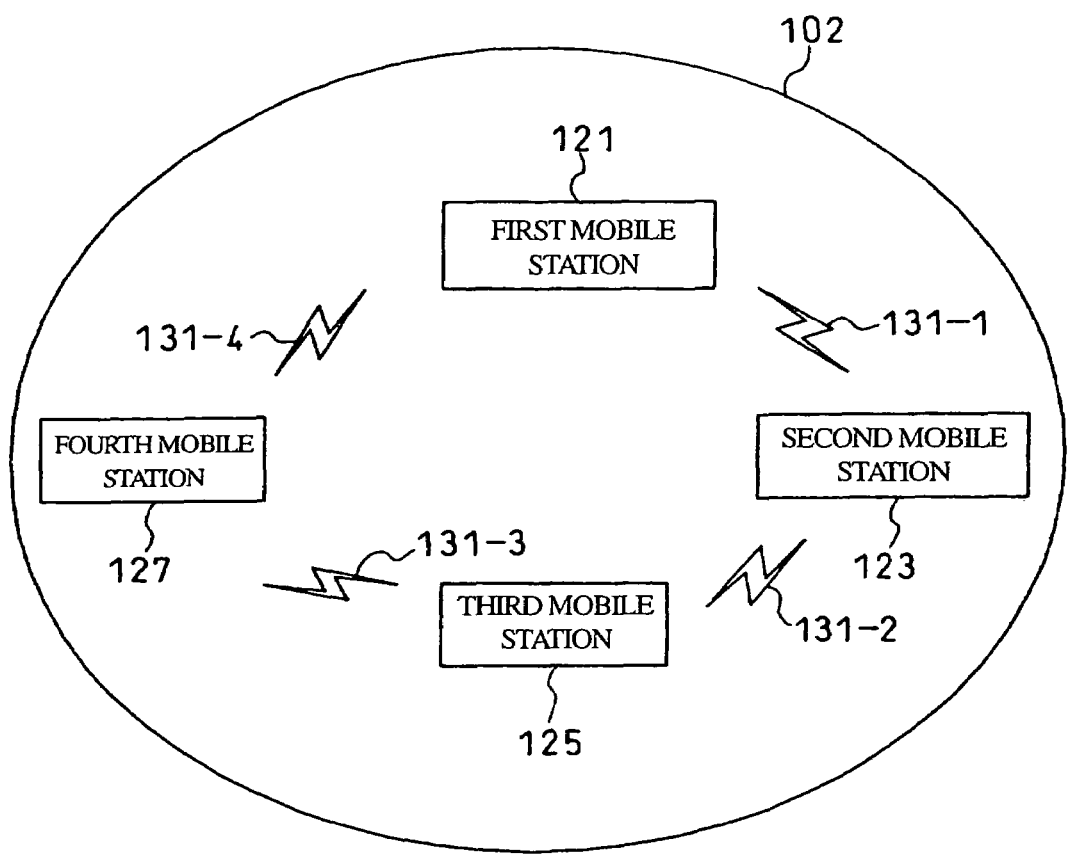
FIG. 13 shows the configuration of a wireless communication system of a conventional distributed control scheme based on the TDMA scheme.

Hereafter, a wireless communication system according to a third embodiment of the invention will be described with reference made to FIG. 11. FIG. 11 shows an example where both a first wireless communication system and a second wireless communication system are of the centralized control scheme with a base station.

As shown in FIG. 11, a first wireless communication system 78 of the centralized control scheme includes a first base station 73, a first mobile station 74, and a second mobile station 75. The first base station 73 is equipped with a central control system 72. The second wireless communication system 79 of the centralized control scheme includes a second base station 76 and a third mobile station 77.

In this embodiment, the same operations as performed by the first mobile station 5 of the second wireless communication system 2 of the distributed control scheme in the first embodiment are performed by the second base station 76 of the second wireless communication system 79 that uses a different wireless communications scheme from the first wireless communication system 78. In this way, based on the same technique as that of the first or second embodiment, interference of radio waves between the first wireless communication system 78 and the second wireless communication system 79 can be reduced while enabling an effective utilization of the time band.

Hereafter, a wireless system according to a fourth embodiment of the invention, namely a base station having a time region allocating means and a time region readjusting means, will be described by referring to the drawings. A control signal of a first wireless system includes information concerning the allocation of transmission/reception time regions for each communications device in a frame which are determined by the time region allocating means of the base station. An example of the allocation scheme is shown in FIG. 14.

Figure 14:
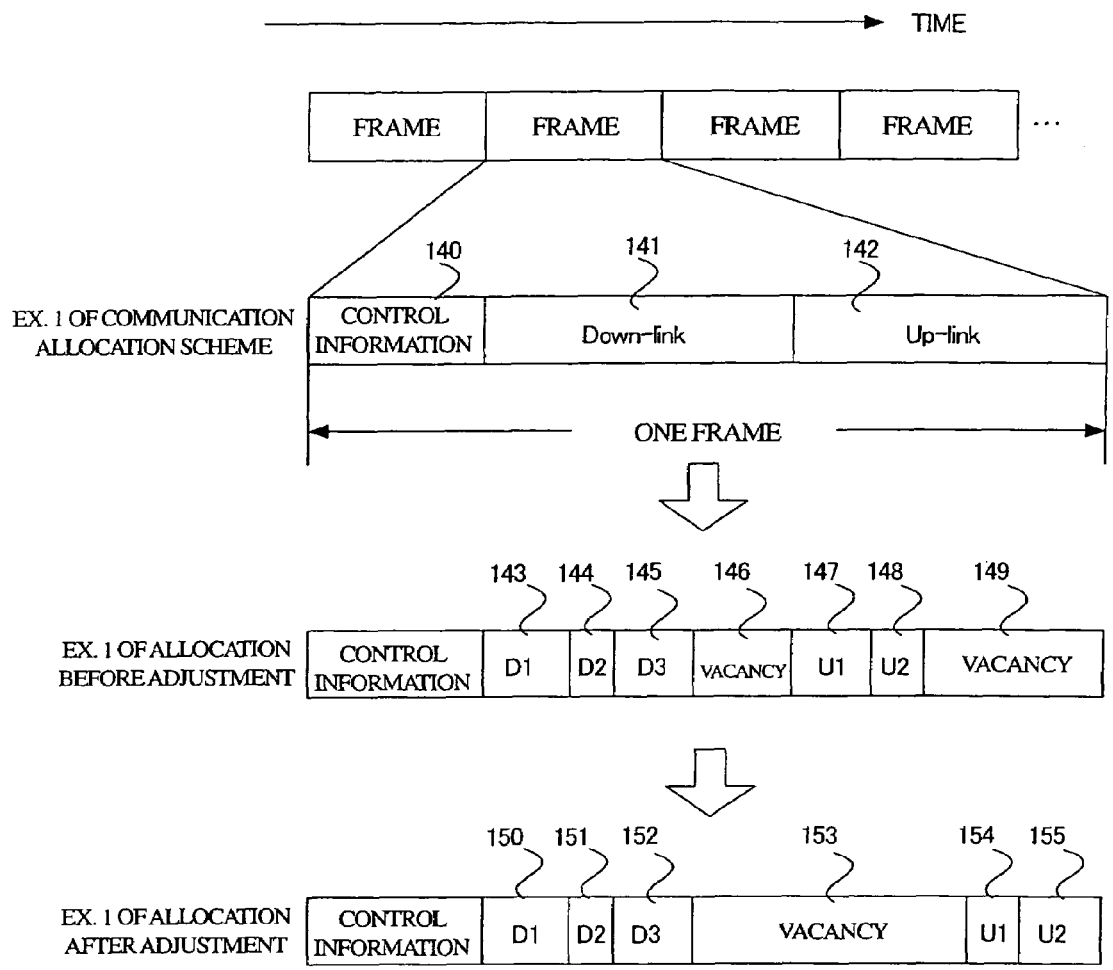
FIG. 14 shows an example of the structure of time region readjusting means in the wireless communication system according to a fourth embodiment of the invention.

As shown in FIG. 14, a communications allocation scheme example 1 includes control information 140 disposed at the head of each frame instructing the allocations in the frame, Down-Link 141 for communication from the base station to the mobile station, and Up-Link 142 for communication from the mobile station to the base station. The boundary between Down-Link 141 and Up-Link 142 may be either variable or fixed.

More specifically, as shown in a pre-adjustment allocation example 1, Down-Link 141 includes an allocation D1 (143) for communication from the base station to the mobile station 1, an allocation D2 (144) for communication from the base station to the mobile station 2, an allocation D3 (145) for communication from the base station to the mobile station 3, and an allocation vacancy (146) for communication from the base station to the mobile station.

Similarly, Up-Link (142) includes an allocation U1 (147) for communication from the mobile station 1 to the base station, an allocation U2 (148) for communication from the mobile station 2 to the base station, and an allocation vacancy (149) for communication from the mobile station to the base station.

In the case of the pre-adjustment allocation example 1, the vacant time which another wireless communication system can utilize occurs intermittently, with each occurrence lasting for a short time, such as 146 and 149 shown. In such a case, it is possible that sufficient time is not available for communications for another wireless communication system, a long allocation time is desired but cannot be obtained, or control for communications becomes complicated.

Thus, as shown in an adjusted allocation example 2, Down-Link (141) is allocated with D1 (150), D2 (151) and D3 (152) consecutively towards the front, as prior to adjustment. Allocations in Up-Link (142) are reversed from those prior to adjustment, namely U2 (154) and then U1 (155), consecutively disposed towards the rear. In this way, the vacant times of Down-Link 141 and Up-Link 142 can be combined into a single vacant time 153. As a result, increases in efficiency of communications by another wireless communication system can be achieved.

In the allocation scheme example or the pre-adjustment allocation example, the allocations might be random or there might be many gaps depending on the mounting method. Such cases however can also be handled by the same processes such that improvements in efficiency of communications by another wireless communication system can be achieved.

A base station of the present invention receives an allocation request from another wireless communication system, wherein, upon reception of the allocation request, the base station adjusts the allocations in a frame of its own communications system as described above.

A base station of the present invention concerns a case where the base station measures the signal intensity of another communications system by carrier sensing or DFS to thereby detect the presence of communications by a communication device other than that in its own communication system, so that the base station can adjust the allocations in a frame of its own communications system as described above for the another communications system.

A The base station of the present invention, which receives an allocation request from another wireless communication system, allocation readjusting means for adjusting the allocation of the communication time region for said first wireless system based on the communication time region request signal from said second wireless system, such that a vacant time region in a frame that can be utilized by said second wireless system can be increased. In this case, even if another communication system does not transmit an allocation request in each frame, the base station provides vacancy for another communication system as much as possible. Thus, improvements in efficiency can be achieved to the extent that the number of exchanges of allocation requests can be reduced.

While in the above-described embodiment, the arrangement of communication regions in Down-Link 141 and Up-Link 142 is changed to create a single vacancy 153 combining the vacant regions of Down-Link 141 and Up-Link 142, this is merely an example and other methods of shaping the vacant regions based on the rearrangement of communication regions may be employed. The shaping of the vacant regions may be based on a method whereby the number of vacant regions is modified by integrating or dividing individual vacant regions depending on their number, size or location, or by a method whereby only the size of individual vacant regions is modified without modifying the number of vacant regions.

A The base station of the present invention measures the signal intensity of another wireless communication system by carrier sensing or DFS to thereby detect the presence of communications in another communication system, so that the base station can adjust the allocations of communication time regions in a frame of its own communication system for another system.

A base station of the present invention which receives an allocation request from another wireless communication system, wherein the presence of another communication system that utilizes a vacant region is detected based on the presence or absence of an allocation request. Upon reception of the allocation request, the base station adjusts the allocations of communication time regions in a frame of its own communication system as described above in accordance with the allocation request, such that the utilization of the vacant region by another system is facilitated.

A base station of the present invention receives an allocation request from another wireless communication system, wherein the base station detects the presence of communications by another wireless communication system based on the fact that it has previously received an allocation request, and adjusts the allocations in a frame in its own communication system for another system even if there is no allocation request in the frame. In this case, even if another communication system does not transmit an allocation request in each frame, the base station provides vacancy for another communication system as much as possible. As a result, improvements in efficiency can be achieved to the extent that the exchange of allocation requests can be reduced. Namely, allocations of time regions are carried out voluntarily such that the vacant region increases when there is another system, resulting in an advantage that there is no need to exchange request signals.

INDUSTRIAL APPLICABILITY

In accordance with the wireless communication system of the invention, a plurality of wireless communication systems using different wireless communication schemes, i.e. the centralized control scheme and the distributed control scheme, can be operated at the same frequency without interference, so that improvements in utilization efficiency of frequency can be achieved.

Apart from the base station of a first wireless communication system, the base station of a second wireless communication system may realize the processes of the mobile station of the distributed control scheme in accordance with the present invention to allocate time regions for a mobile station connected to the base station of the second wireless communication system. In this way, two different wireless communication systems of the centralized control scheme can coexist.

Further, the mobile station or the base station of the second wireless communication system may halt the transmission/reception processing portion or put it on standby in a time region utilized by the first wireless communication system, so that reductions in power consumption can be achieved.

The invention claimed is:

1. A second wireless communication system comprising:
reception means for receiving a control signal transmitted by a first wireless communication system which defines a first communication-enabled period based on said control signal; and
communication control means for determining, based on said control signal received by said reception means, a vacant time region in said first communication-enabled period which is not utilized by said first wireless communication system, and allocating that vacant time region as a communication time region of said second wireless communication system.

2. The second wireless communication system according to claim 1, wherein said communication control means compares the length of consecutive vacant time regions in said vacant time region with the length of said communication time region, and allocates said consecutive vacant time regions to said communication time region if the length of said consecutive vacant time regions is longer than the length of said communication time region.

3. The second wireless communication system according to claim 2, wherein the length of consecutive vacant time regions in said vacant time region is compared with that of said communication time region, wherein the supply of electric power to said reception means and a transmission means is halted if the length of said consecutive vacant time regions is shorter than a predetermined period which is even shorter than the length of said communication time region.

4. The second wireless communication system according to claim 1, wherein the length of consecutive vacant time regions in said vacant time region is compared with that of said communication time region, wherein the supply of electric power to said reception means and a transmission means is halted if the length of said consecutive vacant time regions is shorter than a predetermined period which is even shorter than the length of said communication time region.

5. A base station included in a second wireless communication system comprising at least one base station, said base station comprising:
  reception means for receiving a control signal transmitted by a first wireless communication system, said first wireless communication system defining a first communication-enabled period based on said control signal; and
  communication control means for determining, based on said control signal received by said reception means, a vacant time region in said first communication-enabled period which is not utilized by said first wireless communication system, and allocating that vacant time region as a communication time region of said second wireless communication system.

6. A mobile station included in a second wireless communication system comprising a plurality of mobile stations, said mobile station comprising:
  reception means for receiving a control signal transmitted by a first wireless communication system, said first wireless communication system defining a first communication-enabled period based on said control signal; and communication control means for determining, based on said control signal received by said reception means, a vacant time region in said first communication-enabled period which is not utilized by said first wireless communication system, and allocating that vacant time region as a communication time region of said second wireless communication system.

7. A first wireless communication system which defines a first communication-enabled period based on a control signal, said first wireless communication system comprising:
  time region allocating means for allocating a communication time region for said first wireless system such that a vacant time region in a frame can be utilized by a second wireless system; and
  time region readjusting means for receiving a communication time region request signal requesting for utilization by said second wireless communication system and readjusting, based on said communication time region request signal, the time allocations for a first time region utilized by said first wireless communication system and for a second time region utilized by said second wireless communication system.

8. The first wireless communication system according to claim 7, wherein said time region readjusting means readjusts time allocations such that the time region for said second time region is allocated in a vacant time region for said first time region.

9. The base station of said first wireless communication system according to claim 8, further comprising:
  allocation readjusting means for adjusting the allocation of the communication time region for said first wireless system based on the communication time region request signal from said second wireless system, such that a vacant time region in a frame that can be utilized by said second wireless system is increased.

10. A base station included in a first wireless communication system which defines a first communication-enabled period based on a control signal, said base station comprising:
  time region allocating means for allocating a communication time region for said first wireless system such that a vacant time region in a frame can be utilized by a second wireless system; and
  time region readjusting means for receiving a communication time region request signal requesting for utilization by said second wireless communication system and readjusting the time allocation for a first time region utilized by said first wireless communication system and for a second time region utilized by said second wireless communication system.

11. The base station of said first wireless communication system according to claim 10, further comprising:
  sensing means for sensing the presence of said second wireless system that is conducting communication using a vacant time region of said first wireless communication system; and
  communication time region readjusting means for, upon sensing of the presence of said second wireless communication system by said sensing means, selling the vacant time region in a frame by adjusting the allocation of a communication time region in the frame of said second wireless system.

12. The base station of said first wireless communication system according to claim 11, wherein said sensing means for sensing the presence of said second wireless system comprises a communication time region request signal from said second wireless system, said base station further comprising:
  time region allocating means for allocating, upon sensing of the presence of said second wireless system, a communication time region in said first wireless system such that said vacant time region is increased for a frame in which a request signal is not sent from said second wireless system.

13. The base station of said first wireless communication system according to claim 12, wherein, when the presence of said second wireless system is no longer sensed, the state of allocation of a communication time region for said first wireless system in a frame in a period in which the presence of said second wireless system was sensed is maintained for a desired number of frames.

14. A second wireless communication system including at least one mobile station, said system comprising:
  reception means for receiving a control signal of a first wireless communication system which defines a first communication-enabled period based on a distributed control scheme;
  means for transmitting a communication time region request signal for utilization by said second wireless communication system; and
  communication control means for conducting communication based on a communication-allowing signal transmitted from said first wireless communication system after time allocations for a first time region utilized by said first wireless communication system and a second time region utilized by said second wireless communication system have been readjusted by said first wireless communication system based on said communication time region request signal.

15. The second wireless communication system according to claim 14, wherein the supply of electric power to said reception means and said means for transmitting is halted if said second time region does not fit in a vacant time region of said first time region that is notified via said communication-allowing signal.

16. A mobile station in a second wireless communication system which comprises at least one mobile station, said mobile station comprising:
- reception means for receiving a control signal of a first wireless communication system which defines a first communication-enabled period based on a distributed control scheme;
- means for transmitting a communication time region request signal for utilization by said second wireless communication system; and
- communication control means for conducting its own communication based on a communication-allowing signal transmitted from said first wireless communication system after time allocations for a first time region utilized by said first wireless communication system and a second time region utilized by said second wireless communication system have been readjusted by said first wireless communication system based on said communication time region request signal.

17. A base station included in a second wireless communication system comprising at least one mobile station, said base station comprising:
- reception means for receiving a control signal of a first wireless communication system which defines a first communication-enabled period based on a distributed control scheme;
- means for transmitting a communication time region request signal for utilization by said second wireless communication system; and
- communication control means for conducting communication based on a communication-allowing signal transmitted from said first wireless communication system after time allocations for a first time region utilized by said first wireless communication system and a second time region utilized by said second wireless communication system have been readjusted by said first wireless communication system based on said communication time region request signal.

18. A base station of a first wireless communication system, comprising:
- means for sensing the presence of a second wireless system conducting communication using a vacant time region of said first wireless system; and
- time region allocating means for allocating, upon sensing of said second wireless system, a communication time region for said first wireless system such that a vacant time region in a frame that can be utilized by said second wireless system is increased.

19. The base station of said first wireless communication system according to claim 18, wherein:
- said sensing means for sensing the presence of the second wireless system conducting communication using the vacant time region in said first wireless system comprises means for detecting a communication time region request signal from said second wireless system, wherein the vacant time region available is set in accordance with the communication time region request from said second wireless system.

* * * * *